March 2, 1965 D. H. McKEOUGH 3,171,937

ARC-EXTINGUISHING STRUCTURE FOR COMPRESSED-GAS CIRCUIT INTERRUPTER

Filed May 7, 1962 6 Sheets-Sheet 1

INVENTOR
Daniel H. McKeough
BY
Willard R. Crout
ATTORNEY

March 2, 1965 D. H. McKEOUGH 3,171,937

ARC-EXTINGUISHING STRUCTURE FOR COMPRESSED-GAS CIRCUIT INTERRUPTER

Filed May 7, 1962 6 Sheets-Sheet 2

3,171,937

ARC-EXTINGUISHING STRUCTURE FOR COMPRESSED-GAS CIRCUIT INTERRUPTER

Daniel Harvey McKeough, Burlington, Ontario, Canada, assignor to Canadian Westinghouse Company, Limited, Hamilton, Ontario, Canada Filed May 7, 1962, Ser. No. 192,904
8 Claims. (Cl. 200—148)

This invention relates to compressed-gas circuit interrupters in general and, more particularly, to compressed-gas circuit interrupters using a highly-effective arc-extinguishing gas, such as sulfur-hexafluoride ($SF_6$) gas, for example, as the arc-extinguishing medium.

A general object of the present invention is to provide an improved compressed-gas circuit interrupter which will be highly-efficient, inexpensive, and of modular construction, so as to be suitable for a wide range of current and voltage applications.

Another object of the present invention is to provide an improved compressed-gas circuit interrupter utilizing two different gases, one of which is preferably of highly-effecient arc-extinguishing properties, and the other is preferably a relatively cheap operating gas, such as compressed air, for example, which may be exhausted to the atmosphere.

Still a further object of the present invention is the provision of an improved compressed-gas arc-extinguishing structure in which a suitable operating gas, such as air under pressure, is effective to cause compression of a highly efficient arc-extinguishing gas, such as $SF_6$ for example, through an orifice structure into engagement with the established arc to quickly effect its extinction.

Still a further object of the present invention is the provision of an improved compressed-gas circuit interrupter of modular construction, in which the modular units may be at line potential and situated up in the air an adequate distance above ground potential by the use of insulating columns. Preferably, the upstanding insulating columns enclose suitable operating rods for operating valve structure, which will be effective to cause simultaneous actuation of the plurality of pole-units.

Still a further object of the present invention is the provision of an improved compressed-gas circuit interrupter utilizing novel contact structure which is piston actuated, and employing in conjunction therewith an independently - operable, gas - pressure - producing piston, which is sensitive to a suitable operating gas, such as compressed air.

It is well known that certain electro-negative gases, such as sulfur-hexafluoride ($SF_6$) gas, possess better arc-interrupting properties than other more common gases, or mixtures of gases, such as air, particularly when the former gases are compressed. However, in applying these electro-negative gases in practical circuit interrupters, certain problems exist, which tend to make the apparatus somewhat more complex than it would otherwise be. The major problems are: For effective interruption of high-current alternating-current arcs at practical recovery voltages, for instance 60,000 R.M.S. amperes at 60 R.M.S. kilovolts, relatively high gas pressures are most effective, for example 200 p.s.i.g. If the gas is stored in the apparatus at such relatively high pressures, then all presently-known gases of this type will condense if the temperature falls below a relatively high temperature, which is in the operating range for outdoor apparatus. Consequently, heaters are required with relatively complex control equipment to assure that proper conditions are maintained. The correct functioning of such heaters usually depends upon electrical power, which may not be available for extended periods when the ambient temperature is below condensing temperature.

If the gas is compressed by a mechanically-driven piston operated through a mechanical linkage from an operating mechanism located at some distance from the circuit interrupter, then the instantaneous forces transmitted become very high, and the device becomes relatively impractical for large currents, for instance 60,000 amperes. Power circuit breakers of this general type have the additional disadvantage that the one central operating mechanism and associated linkage will be of various sizes for the various designs of circuit breakers suitable for use on practical high-voltage systems, which, for instance, range from 69 kv. to 600 kv. This makes it difficult for the manufacturer to use interchangeable parts for the various voltage ratings.

Because of the relatively high density of these gases, the flow of a compressed electro-negative gas is relatively slower, and this adds to the interrupting time of the device when the gas is stored at some point relatively remote from the arcing space. For instance, sulfurhexafluoride ($SF_6$) gas has approximately five times the density of air.

Since there is a certain practical limit of recovery voltage which may be applied across one break, it is usual to build high-voltage breakers with a number of breaks in series. For instance, for a 600 kv. circuit breaker, eight to ten series breaks per phase might be required. To test such a device with presently available test laboratories, the full capacity of the short-circuit test station is commonly applied to one break; and the interrupting rating of the complete pole-unit calculated by multiplying this unit rating by the number of series breaks times some empirical factor, which depends upon the voltage distribution between the series breaks. The validity of such a unit test depends upon the relative freedom of each break from the effects of arcing produced at the other breaks. These effects are electrostatic, electromagnetic, thermal, mechanical and hydraulic.

In accordance with the present invention, there is provided an improved circuit interrupter which uses as an interrupting fluid an electro-negative gas at a relatively low stored pressure, for instance sulfur-hexafluoride ($SF_6$) gas at 45 p.s.i.g., so that no heaters are required to prevent condensation in service. The $SF_6$ gas, for example, will be compressed by a bellows-type flexible piston driven by a suitable operating gas, such as compressed air, for example, which will be stored at relatively high pressure at a location relatively close to the arcing space. Each circuit interrupter will be completely self-contained and suitable for application at some convenient increment of operating voltage, for instance 69 kv. Accordingly, the operating gas, such as compressed air, for example, will be effective to separate the contact structure by a suitable piston device, for example, and also to effect compression of the arc-extinguishing gas, such as sulfur hexafluoride ($SF_6$) gas, for directing the same under pressure through a suitable orifice structure into engagement with the arc. By utilizing valve control rods in conjunction with the different modular units, simultaneous control of all of the units may be achieved by a simple electroresponsive device, such as a latched relay, which may be at ground potential and effective to maintain the interrupter in either the open or closed-circuit position.

According to another feature of the present invention, by connecting multiples of the various modular units in series electrically, and insulating them from ground on insulating columns, various operating voltages may be obtained. Since each modular unit is relatively independent of the other units, the unit testing method may be validly employed. Since the energy to compress the interrupting fluid and move the contacts will be stored in each unit, it will only be necessary to transmit relatively small forces to operate the control valves.

Further objects and advantages will readily become apparent upon reading the following specification, taken in conjunction with the drawings, in which.

Figure 1:
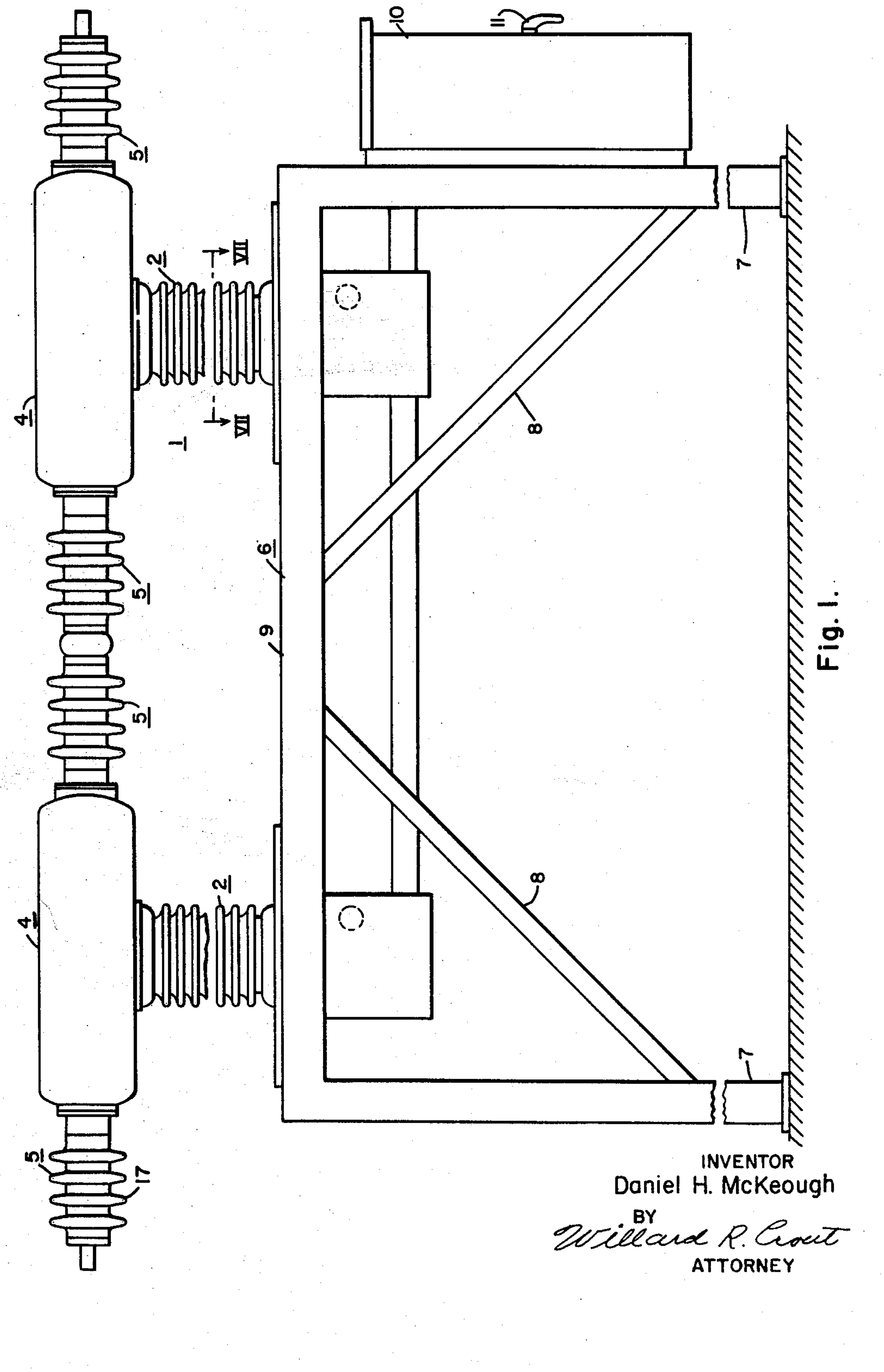
FIGURE 1 is a side elevational view of a high-voltage compressed-gas circuit interrupter embodying a plurality of modular units and adapted for three-phase operation.
Figure 2:
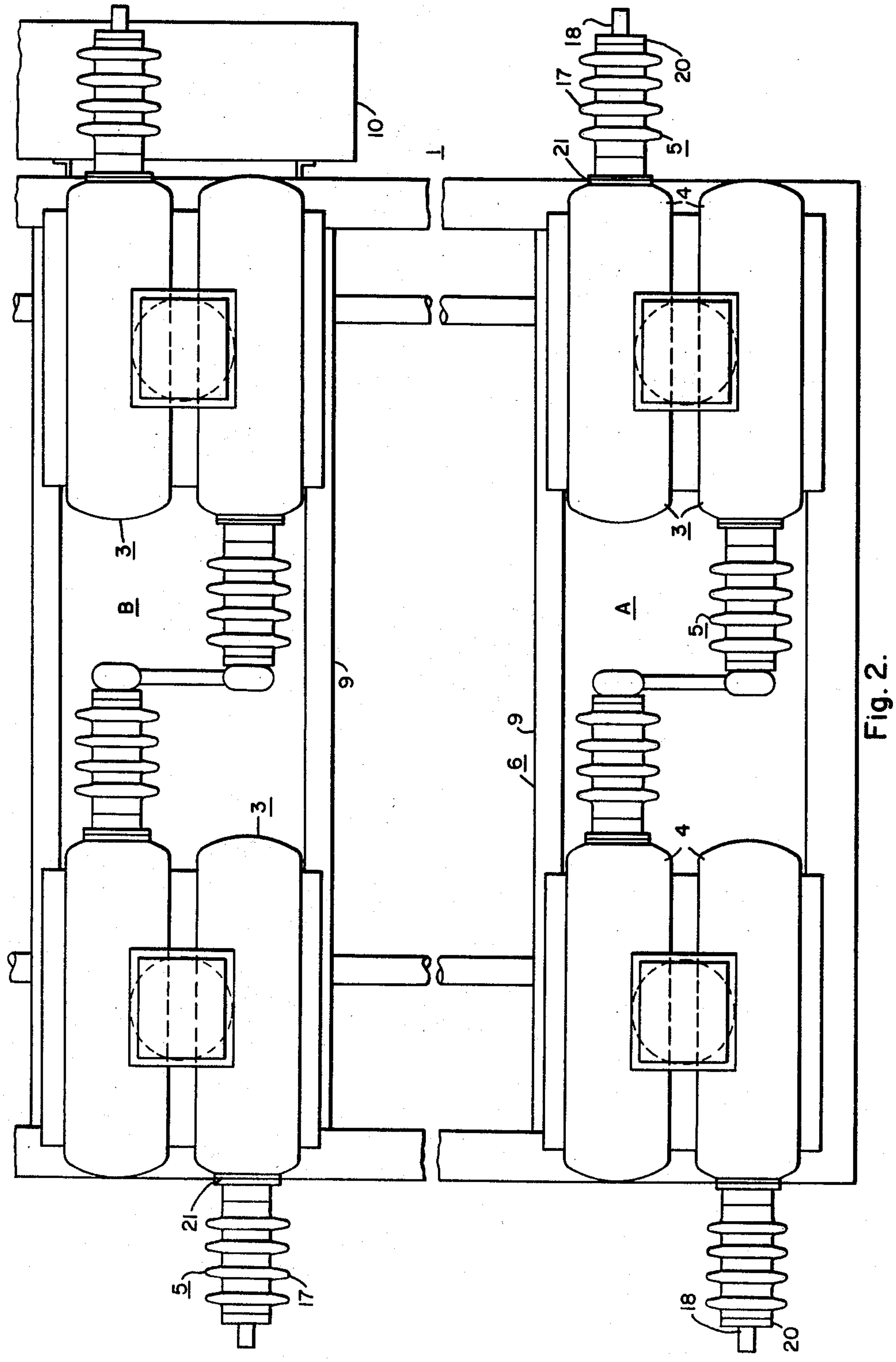
FIG. 2 is a fragmentary top plan view of the three-phase circuit interrupter of FIG. 1.
Figure 3:
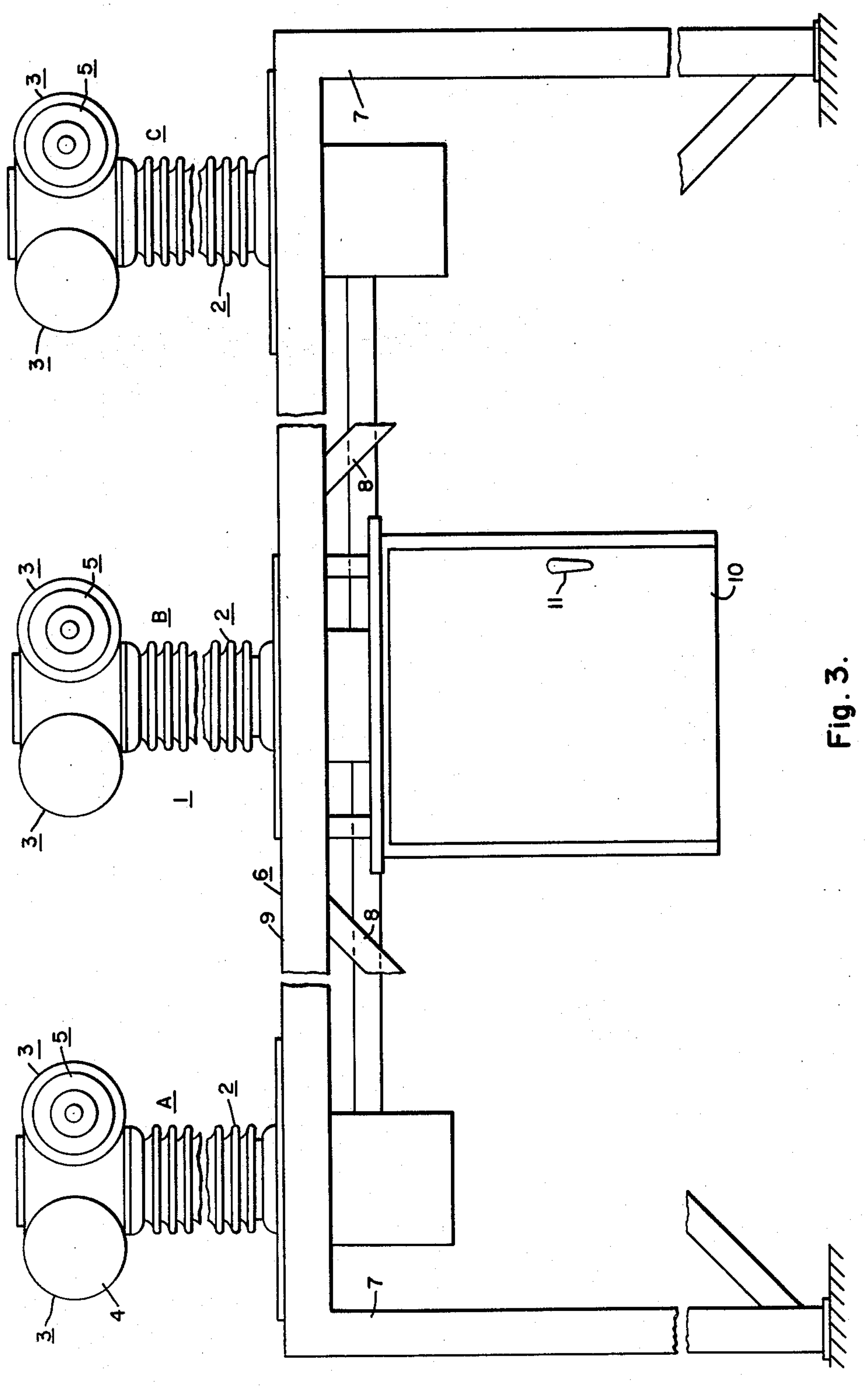
FIG. 3 is an end elevational view of the three-phase compressed-gas circuit interrupter of FIG. 1.

Referring to the drawings, and more particularly to FIG. 1 thereof, the reference numeral 1 generally designates a high-voltage compressed-gas circuit interrupter. Generally, each compressed-gas circuit interrupter 1 comprises a plurality of pole-units A, B, C (FIG. 3) arranged to control the different phases of the transmission system. With particular reference to FIGS. 1 and 2, it will be noted that there is provided upstanding insulating column means 2, which supports a pair of modular units 3 (FIG. 2) at the upper end thereof. It will be observed that each modular unit 3 includes a multi-part metallic storage tank 4 into which extends a terminal bushing 5.

As shown in FIG. 1, each phase circuit has a pair of columns 2 and four series-connected modular units 3. Such a structure is sufficient for controlling a 230 kv. circuit, for example. It will be apparent to those skilled in the art that by utilizing additional columns 2 and additional modular units 3 a structure may result for interrupting even higher voltages and current ratings.

As shown in FIG. 1, the two insulating columns 2 are supported upon an angle-iron framework 6 comprising upright supports 7, angle braces 8 and horizontal supports 9. A control cabinet 10 having a manually-operable handle 11 is provided for housing certain actuating mechanism, more fully described hereinafter.

Figure 4:
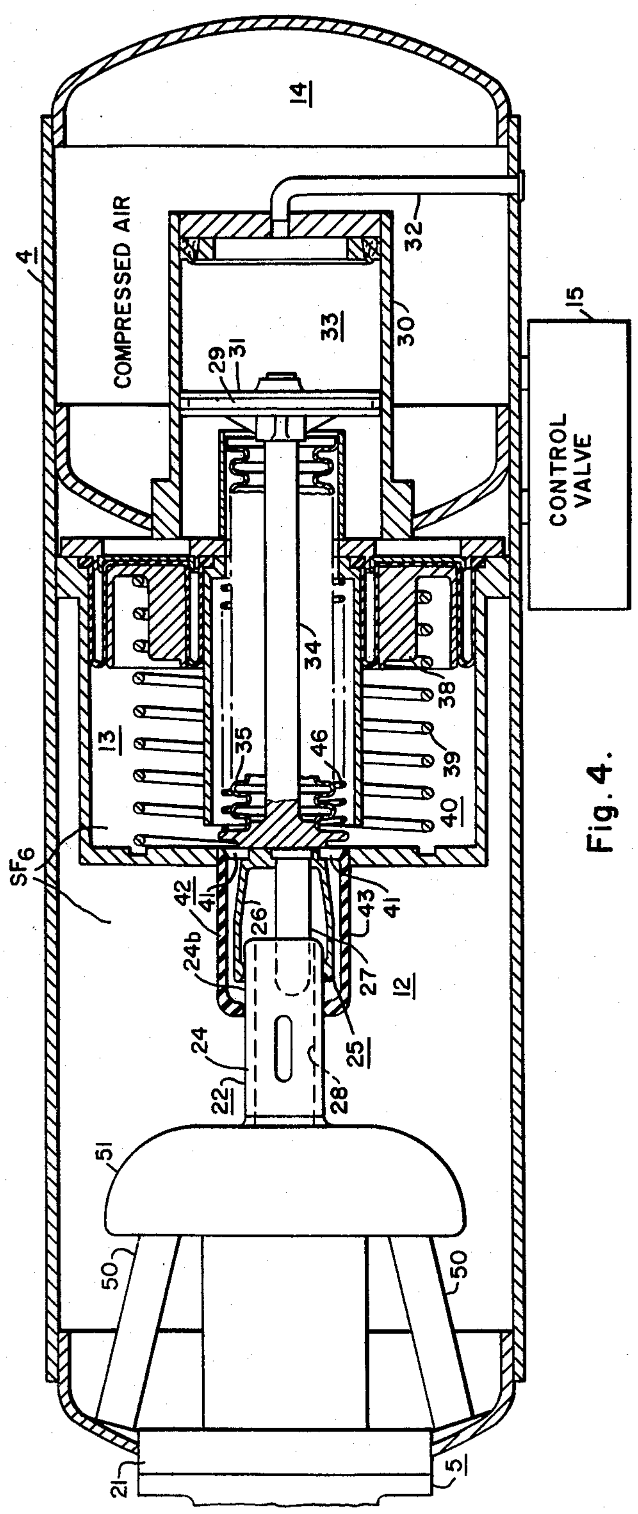
FIG. 4 is a considerably-enlarged, vertical sectional view taken through one of the modular compressed-gas arc-extinguishing units, the contact structure being illustrated in the closed-circuit position.
Figure 5:
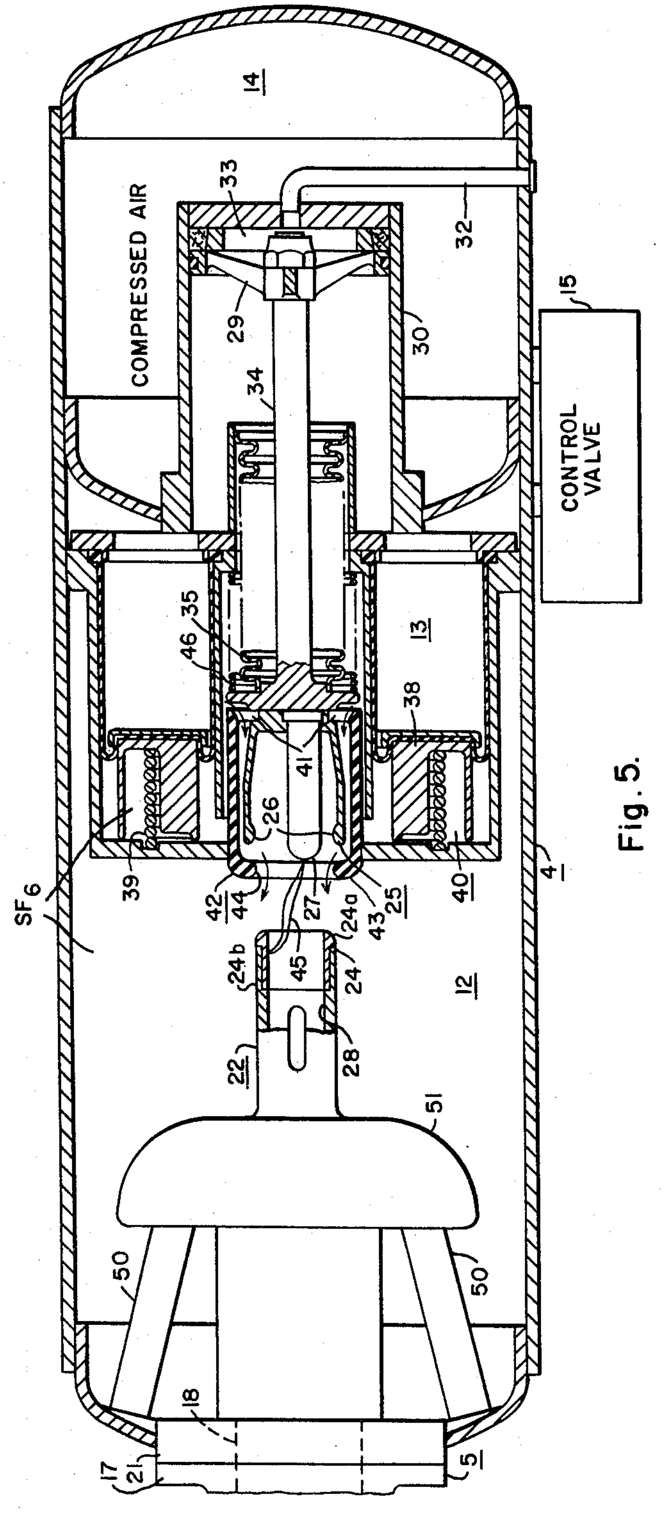
FIG. 5 is a view similar to that of FIG. 4, but illustrating the position of the several component parts of the arc-extinguishing unit during the opening operation of the interrupter.

With reference to FIGS. 4 and 5 of the drawings, which show the modular units 3 in the closed and open-circuit positions, respectively, it will be noted that the mulit-part metallic reservoir tank 4 comprises an arcing chamber 12, an intermediate actuating chamber 13 and a reservoir chamber 14. Preferably a highly-efficient arc-extinguishing gas, which has a higher interrupting ability than air at the same pressure, is disposed within the arcing chamber 12. As previously mentioned, this may be sulfur-hexafluoride ($SF_6$) gas, for example, at a pressure of 45 p.s.i.g. Additionally, a suitable operating fluid, such as compressed air, for example, is disposed within the reservoir chamber 14. The actuating chamber 13 is, at times, pneumatically connected to the reservoir chamber 14 by way of a control valve, generally designated by the reference numeral 15, and operated by an insulating valve rod 16 which extends downwardly interiorly of the insulating column 2.

As well known by those skilled in the art, the terminal bushing 5 comprises a weatherproof casing 17, a longitudinally-extending terminal stud 18 and an outer clamping collar 20. Preferably, metallic flange means 21 is provided to fixedly secure the terminal bushing 5 into a proper position. This terminal bushing may be of the condenser type. Disposed at the interior end of the terminal stud 18 and secured thereto, as by a threaded connection, is a relatively stationary contact structure, generally designated by the reference numeral 22, and, in this particular instance, including a tubular vented stationary contact 24. An arc-resisting ring-shaped tip portion 24*a* is associated with the relatively stationary contact 24 to protect the same from the effects of arcing.

Cooperable with the external surface 24*b* of the relatively stationary contact 24, as more clearly shown in FIG. 4, is a movable contact structure, generally designated by the reference numeral 25, and comprising a plurality of resilient contact fingers 26 and a movable rod-shaped arcing horn 27. As shown in FIG. 4, in the closed-circuit position of the device, the flexible arcing fingers 26 resiliently engage the external surface 24*b* of the relatively stationary tubular contact 24 with the arcing horn 27 protruding into the interior 28 thereof.

To effect the actuation of the movable contact structure 25 to the open and closed-circuit positions, there is provided an actuating piston 29 movable within an operating cylinder 30, and having the rear face thereof 31 vented by means of a vent pipe 32. Thus, at all times there is disposed substantially atmospheric pressure within the region 33 (FIG. 4) rearwardly of the actuating piston 29. Mechanically interconnecting the piston 29 with the movable contact structure 25 is a piston rod 34, to which is secured, as by soldering, a flexible bellows 35. The purpose of the flexible bellows 35 is to prevent intercommunication between the compressed air, which may be either at atmospheric pressure or at the tank reservoir pressure within intermediate region 13, with the sulfur-hexafluoride gas, which is present within the arcing region 12 at a pressure of, for example, 45 p.s.i.g.

From the foregoing, it will be apparent that there is provided contact means 24, 25 separable to establish an arc and a first piston means 29 operable to effect lengthening of the arc and to effect contact closure. In addition, there is also provided a second piston means 38 biased by a retraction spring 39 to its rightward terminal position, as shown in FIG. 4, the function of the second piston means 38 being to effect compression of the sulfur-hexafluoride gas within a compressible volume 40. In other words, comparing FIG. 5 with FIG. 4, it will be noted that the second piston means 38 has been moved toward the left to effect compression of the $SF_6$ gas within the region 40, forcing this compressed gas to flow through apertures 41 provided in an orifice structure, generally designated by the reference numeral 42, and comprising a suitably configured tubularly-shaped insulating orifice 43 secured to, and movable with, the movable contact 25, and functioning to direct the compressed $SF_6$ gas through the orifice opening 44 and into intimate engagement with the established arc 45 to effect the extinction thereof.

Although FIG. 5 shows the disposition of the several parts in the fully open-circuit position of the interrupter 1, nevertheless, for purposes of illustration, the established arc 45 has been drawn into the figure to more clearly indicate the manner of arc interruption and to show the direction of the fluid flow.

From the foregoing description, it will be apparent that when compressed air, say at a pressure of 300 p.s.i.g. is admitted, by way of the control valve 15 from the compressed air reservoir chamber 14 into the actuating chamber 13, this compressed air present within actuating chamber 13 performs two functions: First, this compressed air effects rightward opening movement of the first piston means 29 to effect contact separation and arc drawal, and secondly, the compressed air within intermediate actuating chamber 13 is effective to drive the second piston means 38 toward the left, as viewed in FIG. 5, compressing the sulfur-hexafluoride ($SF_6$) gas within the region 40 and forcing it to pass through the apertures 41 provided in the orifice structure 42 and into engagement with the established arc 45 to effect the extinction thereof.

To effect a closing operation of the circuit interrupter 1, the control valve 15 is operated to effect a venting of the compressed air from the actuating region 13. This permits the retracting spring 39 to drive the second piston means 38 toward the right, as shown in FIG. 4, thereby effecting a circulation of $SF_6$ gas within the arcing chamber 12. In addition, the reduction of pressure within the intermediate region 13 permits a retracting closing spring 46 to effect leftward closing movement of the first piston means 29 and hence closing of the movable contact structure 25 into closing engagement with the relatively stationary contact structure 22, as shown in FIG. 4.

With reference to FIG. 2 of the drawings, it will be observed that there are a number of serially-related modular arc-extinguishing units 3 disposed in series in each phase circuit. To effect substantial equal division of voltage between the several units 3 in each phase circuit, preferably voltage-gradation means such as condenser tubes 50, are provided being connected between the relatively stationary contact structure 22 and the metallic multi-part reservoir tank 4. Since the tank 4 is electrically connected to the movable contact structure 25, it will be obvious that the voltage-dividing impedance tubes 50 are in parallel with the arm 45, and tend to improve the voltage distribution between the several arc-extinguishing units 3. To minimize the possibility of interior voltage breakdown, an electrostatic shield 51 is fixedly secured to the relatively stationary contact 24 and serves, in addition, to shield the voltage-dividing tubes 50 from the hot arc gases, as shown in FIGS. 4 and 5.

Figures 6, 7:
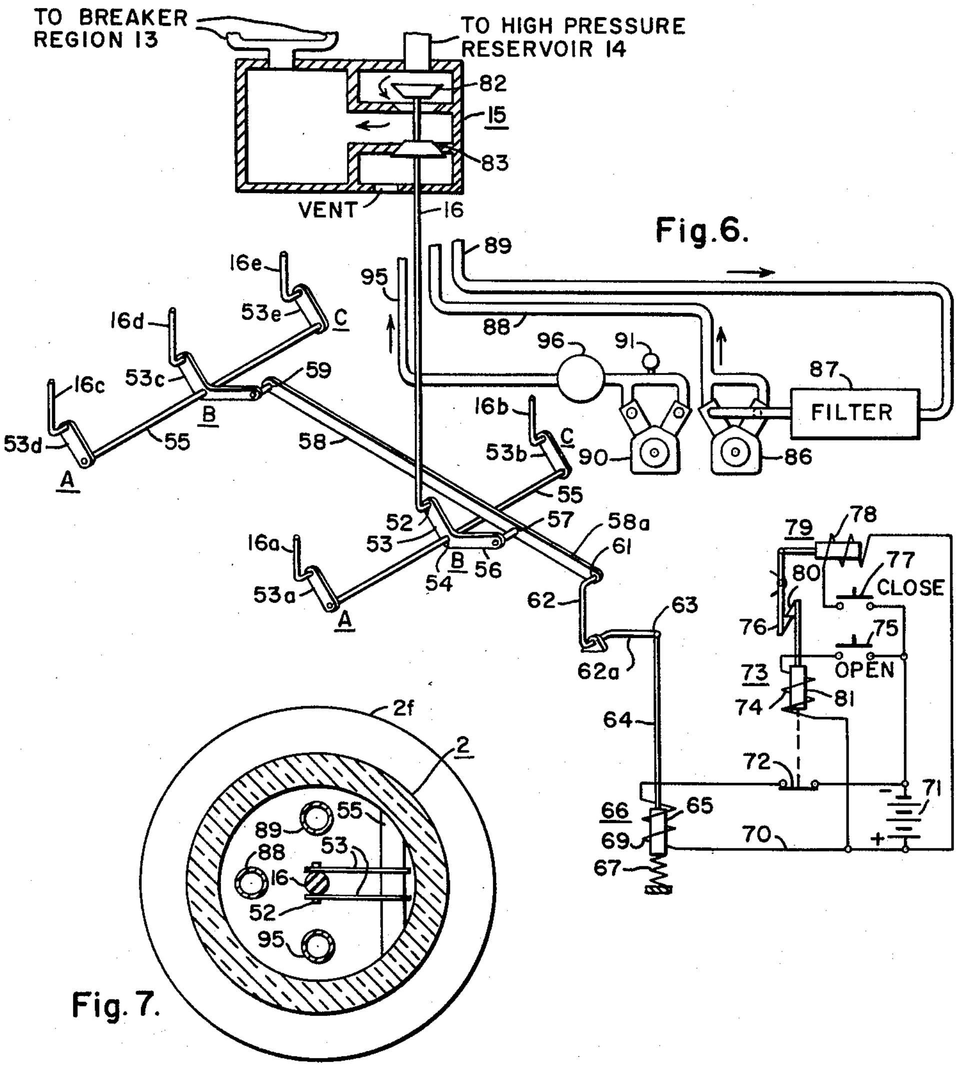
FIG. 6 is a somewhat diagrammatic view illustrating the operation of the control-valve structure of the several units by suitable mechanism enclosed within the control cabinet.
FIG. 7 is a sectional view taken substantially along the line VII—VII of FIG. 1.

As shown more clearly in FIG. 6, the valve rod 16 for each control valve 15 extends downwardly interiorly of the insulating column 2 and is pivotally connected, as at 52, to a bell-crank 53, the latter being pivotally supported upon a fixed pivot 54. The fixed pivot 54 is clamped to a transversely-extending valve-operating rod 55 having fixedly secured thereto additional bell-cranks 53*a*, 53*b*, which serve to effect actuation of additional valve rods 16*a*, 16*b* extending upwardly through adjacently-disposed insulator columns 2 of the adjacent phase circuits.

An additional arm 56 of the bell-crank lever 53 has pivotally secured thereto, as at 57, a horizontally-extending valve rod 58 which, in turn, is mechanically connected, as at 59, to an additional bellcrank lever 53*c*. By way of an additional transversely-extending valve rod 55, additional bell-crank levers 53*d*, 53*e* are actuated to effect reciprocal vertical movement of additional valve rods 16*c*, 16*d* and 16*e* in adjacent columns 2.

The valve rod 58 has an extension 58*a* which is pivotally connected, as at 61, to a bell-crank 62, the latter having an arm 62*a* which is pivotally connected, as at 63, to a connecting rod 64 having the armature 65 of an electroresponsive device 66 attached thereto. A biasing means 67, such as a compression spring, serves to bias the armature 65 and the several valve rods 16, 16*a*, 16*b*, etc. to a breaker-closed position.

An energizing coil 69 effects downward breaker-opening movement of the armature 65. The circuit 70 of the solenoid 69 is energized through a battery 71 by way of normally-open contact 72 of a latching device 73, the energizing coil 74 of which is connected to the battery 71 by way of a "breaker open" push button 75. Thus, closing of the "breaker open" push button 75 will energize solenoid 74, closing contact 72 and, in turn, energizing solenoid 69 to effect valve-opening movement, such as shown in FIG. 6, permitting the entrance of high-pressure gas from reservoir 14 into the intermediate regions 13 of adjacently disposed modular arc-extinguishing units 13 associated at the top of each insulator column 2. This will effect breaker-opening movement as described hereinbefore, and a latch 76 insures maintenance of the contact 72 in their closed position despite subsequent deenergization of the solenoid 74 of electroresponsive device 73.

To effect closure of the circuit interrupter 1, a "closing" push button 77 is employed to energize the solenoid 78 of a latch-release relay 79. This will rotate the latch 76 to release the latch nose 80 secured to the armature 81 of the device 73. Thus, closing of the "close" push button 77 will rotate the latch 76 releasing the bridging contact 72 thereby opening the circuit 70 and permitting the biasing means 67 to effect closure of the valve component 82 and opening of the vent valve 83 of the valve device 15. This will reduce the pressure within intermediate regions 13 and thereby effect closure of the contacts 24, 25 by virtue of the biasing springs 46.

To effect circulation of the $SF_6$ gas for certain applications where it is desirable to circulate the gas through filter units, preferably a compressor 86 is provided in conjunction with a filter unit 87 containing activated alumina in series with feed and exhaust pipes 88, 89 which, through branch connections insures a circulation of the $SF_6$ gas within the several arcing chambers 12 additionally, a compressor 90 is provided to maintain the compressed-air storage reservoir 14 at the desired pressure, a pressure gauge 91 being provided for this purpose. A compressed-air line 95 interconnects a compressed-air reservoir 96 with the several compressed-air reservoir chambers 14 of the pole-units.

FIG. 7 illustrates the relative location of several component parts extending upwardly through the several insulator columns 2.

Figure 7A:
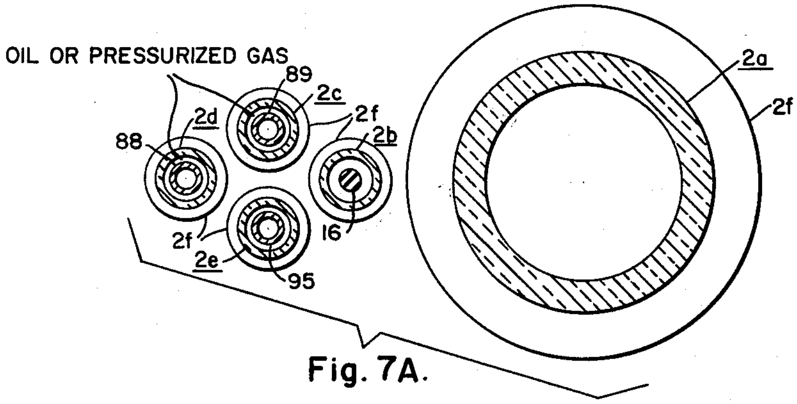
FIG. 7A illustrates a sectional view taken through a modified type of supporting column structure, wherein the control pipes and operating rod structure are situated separately from the main supporting column for the pole-unit.

FIG. 7A illustrates, in section, a modified type of supporting and conduit arrangement in which separate hollow columns 2*a*–2*e* are provided having disposed therewithin an insulating fluid, such as pressurized $SF_6$ gas or an insulating oil. The conduits 88, 89 and 95 have the same reference numerals and provide the same functions as before. The operating rod 16, as shown in FIG. 7A, is also extended upwardly through the separate hollow column 2*b*. To increase creepage distance, spaced petticoats 2*f* may be provided on the external surfaces of the columns, as well known by those skilled in the art.

From the foregoing description, it will be apparent that there is provided an improved compressed-gas circuit interrupter in which due to the reduction of pressure of the electro-negative gas, there is no possibility of condensation at the particular pressure utilized. In addition, an inexpensive operating gas, such as compressed air, is employed to effect contact-opening movement and compression of the arc-extinguishing gas by use of the second piston means 38. Moreover, by utilizing a number of modular arc-extinguishing units 3 in series, the circuit interrupter 1 is readily adapted to any voltage and current rating.

Although there has been illustrated and described a specific structure, it is to be clearly understood that the same was merely for the purpose of illustration, and that changes and modifications may readily be made therein by those skilled in the art without departing from the spirit and scope of the invention.

I claim as my invention:

1. A compressed-gas circuit interrupter including a multi-part metallic reservoir tank at line potential, a high-voltage terminal bushing extending into said live tank and carrying a relatively stationary contact at its interior end, a movable contact separable from the stationary contact to establish an arc, piston means for actuating said movable contact, a gas adjacent said relatively stationary contact in one part of said multi-part metallic reservoir tank having higher interrupting ability than air at the same pressure, compressed air disposed within another part of said multi-part metallic reservoir tank, and means utilizing said compressed air to effect piston and contact motion and also to effect compression of the first-mentioned gas.

2. A compressed-gas circuit interrupter including a multi-part metallic reservoir tank at line potential, a high-voltage terminal bushing extending into said live tank and carrying a relatively stationary contact at its interior end, a movable contact separable from the stationary contact to establish an arc, piston means for actuating said movable contact, a gas adjacent said relatively stationary contact in one part of said multi-part metallic reservoir tank having higher interrupting ability than air at the same pressure, compressed air disposed within another part of said multi-part metallic reservoir tank, means utilizing said compressed air to effect piston and contact motion, a movable orifice structure movable in response to motion of said movable contact, and means utilizing the compressed air for forcing said first-mentioned gas under pressure through said movable orifice structure to effect extinction of the arc.

3. A compressed-gas circuit interrupter including a multi-part metallic reservoir tank at line potential, a high-voltage terminal bushing extending into said live tank and carrying a relatively stationary contact at its interior end, a movable contact separable from the stationary contact to establish an arc, piston means for actuating said movable contact, means venting the back side of said piston means to relatively low pressure, a gas adjacent said relatively stationary contact in one part of said multi-part metallic reservoir tank having higher interrupting ability than air at the same pressure, compressed air disposed within another part of said multi-part metallic reservoir tank, and means utilizing said compressed air to effect piston and contact motion and also to effect compression of the first-mentioned gas.

4. The combination in a compressed-gas circuit interrupter of upstanding insulating column means, a generally three-part metallic reservoir tank at line potential disposed at the upper end of said upstanding insulating column means an adequate distance from ground potential, a terminal bushing extending within said three-part metallic reservoir tank and carrying relatively stationary contact structure at its interior end, movable contact structure carrying movable orifice structure cooperable with said relatively stationary contact structure to establish an arc, a gas disposed adjacent the contact structure within one part of said generally three-part metallic reservoir tank having a higher interrupting capacity than air at the same pressure, compressed-air disposed in another part of said generally three-part reservoir tank, first and second piston means for respectively effecting contact motion and extinguishing gas compression, and compressed-air valve control means for alternately pressurizing and exhausting an intermediate part of said generally three-part reservoir tank, whereby the admission of compressed air from one part into said intermediate part will actuate the first and second piston means.

5. The combination according to claim 4, wherein an operating cylinder is provided for the first piston means, and flexible non-permeable wall means are associated with said second piston means to prevent intercommunication of the gases.

6. The combination according to claim 4, wherein a pair of reservoir tanks having a pair of terminal bushings are provided with the tanks in mechanical and electrical interconnection.

7. A high-voltage compressed-gas circuit interrupter including a plurality of upstanding insulating columns, a pair of generally three-part metallic reservoir tanks disposed at the upper end of each insulating column an adequate distance from ground potential, a pair of terminal bushings associated with the pair of metallic tanks extending therein and carrying relatively stationary contacts, movable contact structures carrying movable orifice structures being cooperable with said relatively stationary contact structures to establish two series arcs, a gas disposed adjacent the contact structure within one part of each generally three-part metallic reservoir tank having a higher interrupting capacity than air at the same pressure, compressed-air disposed in another part of each generally three-part reservoir tank, first and second piston means for respectively effecting contact motion and extinguishing gas compression in each tank, and compressed-air valve control means for alternately pressurizing and exhausting an intermediate part of each generally three-part reservoir tank, whereby the admission of compressed air from one part into said intermediate part will actuate the first and second piston means, an insulating valve control rod extending upwardly within each insulating column, and means mechanically interconnecting the valve control rods at ground potential for simultaneous operation.

8. The combination according to claim 7, wherein latched electro-responsive means maintain the valve control rods in one position.

References Cited in the file of this patent

UNITED STATES PATENTS

| | | |
|---|---|---|
| 2,611,846 | Applegate | Sept. 23, 1952 |
| 2,733,316 | Brown et al. | Jan. 31, 1956 |
| 2,964,605 | Schulz | Dec. 13, 1960 |
| 3,075,060 | Strom | Jan. 22, 1963 |

FOREIGN PATENTS

| | | |
|---|---|---|
| 369,189 | Great Britain | 1932 |